Figure 1:
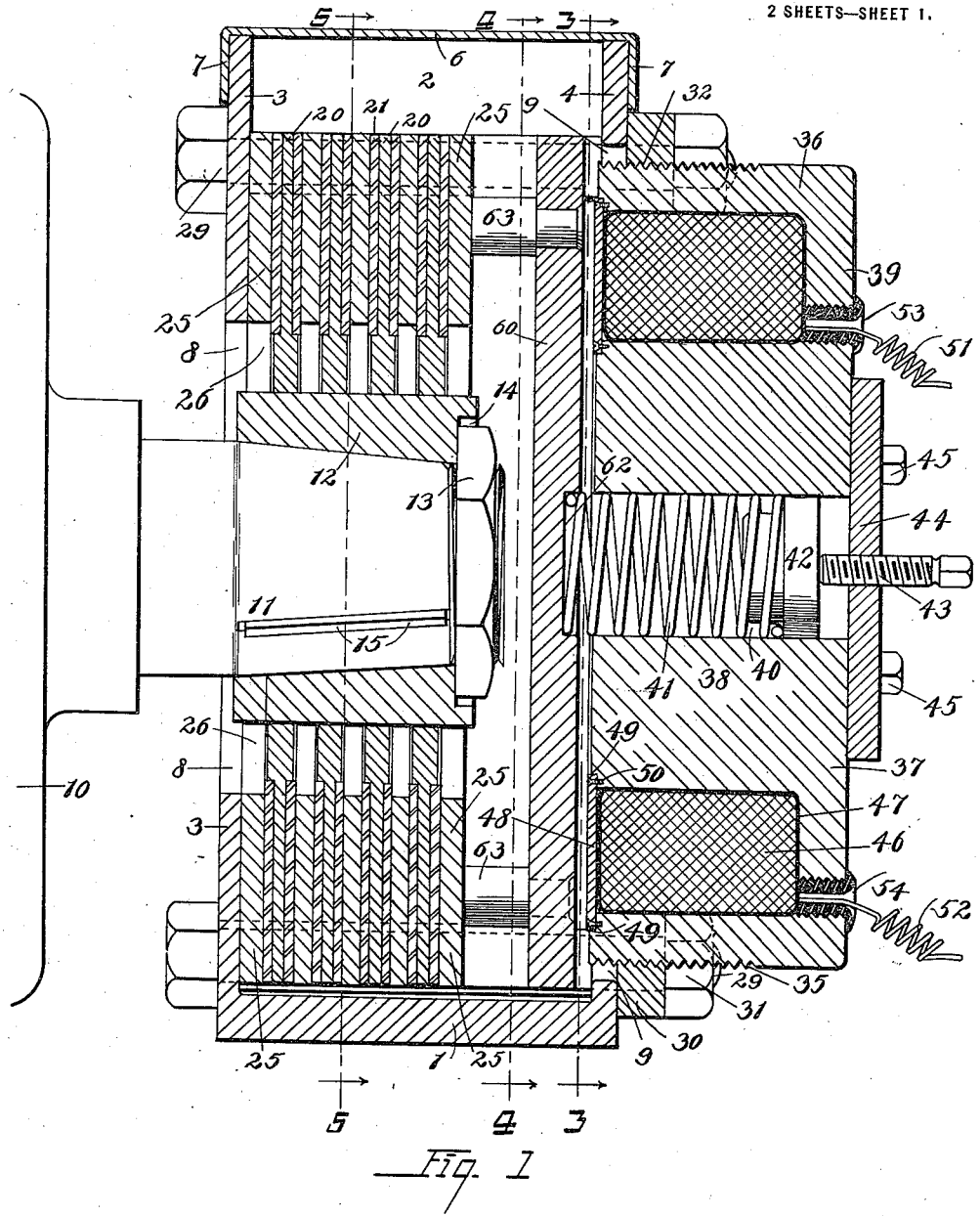

T. W. THOMAS.
BRAKE.
APPLICATION FILED OCT. 30, 1914.

1,172,917.

Patented Feb. 22, 1916.
2 SHEETS—SHEET 1.

Witnesses
H. J. Small
R. L. Bruck

Inventor
Thomas W. Thomas
By Hull and Smith
Attys.

T. W. THOMAS.
BRAKE.
APPLICATION FILED OCT. 30, 1914.

1,172,917.

Patented Feb. 22, 1916.
2 SHEETS—SHEET 2.

Witnesses
H. Small
R. L. Bruck

Inventor
Thomas W. Thomas
By Hill and Smith
Attys.

UNITED STATES PATENT OFFICE.

THOMAS W. THOMAS, OF ASHTABULA, OHIO.

BRAKE.

1,172,917.  Specification of Letters Patent.  Patented Feb. 22, 1916.

Application filed October 30, 1914. Serial No. 869,474.

*To all whom it may concern:*

Be it known that I, THOMAS W. THOMAS, a citizen of the United States, residing at Ashtabula, in the county of Ashtabula and State of Ohio, have invented a certain new and useful Improvement in Brakes, of which the following is a full, clear, and exact description, reference being had to the accompanying drawings.

This invention relates to improvements in electro-magnetically controlled brakes; and it has for one of its objects to provide a brake of this character, the operating parts whereof, including the face of the magnet and the armature, are incased and thoroughly protected from dust and dirt and, in case the brake is exposed to the weather, from rain, ice or snow.

A further object of the invention is to provide an electro-magnetically controlled disk brake that can be very accurately and readily adjusted to compensate for the wear of the brake disks without having to dismantle the brake. In the present type of electro-magnetically controlled brakes with which I am familiar, in order to accomplish the above adjustment it is necessary to partially disassemble the brakes. The reason for this is that the space or "air gap" between the armature plate and the face of the magnet, which gradually increases as the disks wear, is produced by placing upon the bolts which support the magnet, series of thin washers. Now, as the disks wear and the space or "air gap" becomes excessive, the magnet is removed, and what is believed to be the required number of washers, is taken out and the magnet is then replaced, after which the brake may be tested to ascertain the correctness of the adjustment. When it is taken into consideration that the aforesaid space or "air gap" bears a very definite relation to the strength of the spring which is used in applying this brake, and to the strength of the magnetism used for releasing the brake, it will be seen that the above method of adjusting the magnet is quite difficult and unsatisfactory, and might require the removal of the magnet a number of times before the proper adjustment is finally obtaind. Furthermore, because of the required accuracy of adjustment the removal of one washer from each of the bolts, even though the washers be very thin, sometimes results in too great a variation in the position of the magnet, and the subsequent operation of the brake will be found unsatisfactory. Also, the principle of constructing these prevailing types of brakes, requires that the armature plate and the face of the magnet be exposed and unprotected from the elements.

Among the general objects comprehended by my invention is the provision of a brake of the aforesaid nature that is highly efficient; that is substantial and comparatively simple of construction; that is very durable and that is positive of operation.

Figure 2:
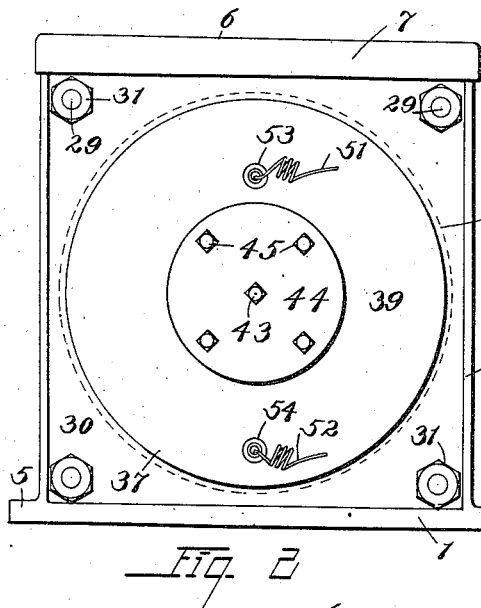
Figure 3:
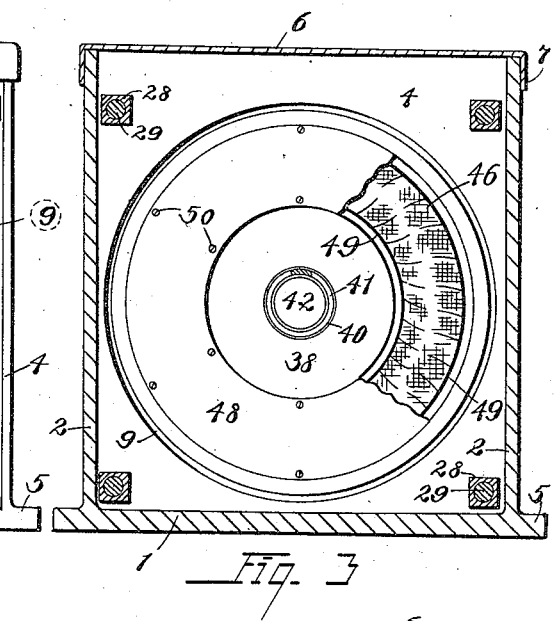
Figure 4:
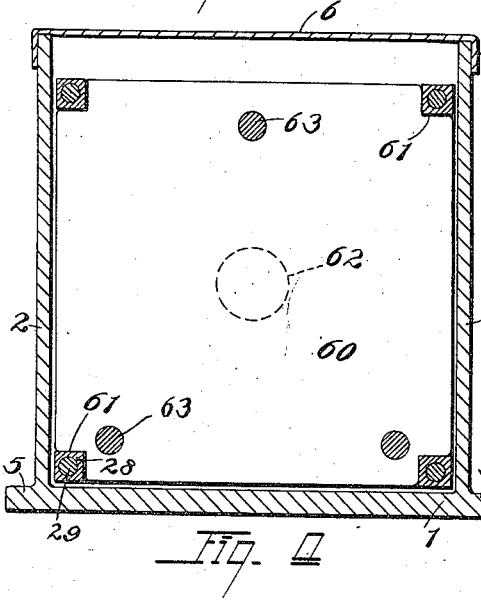
Figure 5:
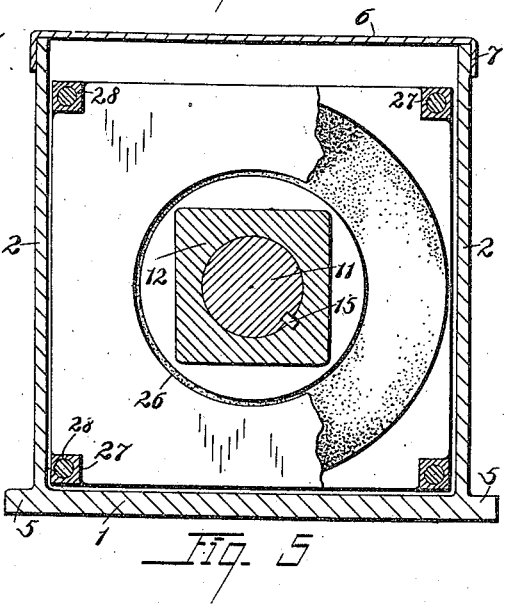

In the accompanying drawings which form a part hereof, Figure 1 is a central vertical section through my improved brake, and shows the same applied to the end of a motor shaft; Fig. 2 is what may be considered a rear end elevation of the brake, the same being viewed from the right of Fig. 1; and Figs. 3, 4 and 5 are transverse vertical sections through the brake on the respective lines 3—3, 4—4, and 5—5 of Fig. 1.

Referring to the drawings by the use of reference characters, the brake casing is composed of a base 1, side walls 2, and front and rear walls 3 and 4, respectively, all of which are preferably formed of a single casting. The base is shown as extending beyond the side walls 2 to provide lugs 5, whereby the brake may be secured to a supporting surface. A cover 6, which may be formed of sheet metal, is provided for the top of the casing and has a flange 7 which overhangs the vertical walls of the casing. The front wall 3 is provided with a substantially central aperture 8, and the rear wall with an aperture 9 which occupies the entire central portion of said wall to within a short distance of its upper, lower and side edges, as indicated by dotted line in Fig. 2. For the sake of economy and convenience, the apertures 8 and 9 are preferably cored at the time of casting the casing.

The rear end of a motor 10 is shown in Fig. 1, and the shaft 11 thereof projects through the aperture 8 in the front wall of the casing. To the tapered end of the shaft is secured a block or hub 12, by means of the nut 13, which is threaded upon the end of the motor shaft and occupies a recess 14 in the rear face of the hub. The hub is locked against rotation upon the shaft, by means of the key 15.

Slidably mounted upon the hub 12 are what I will refer to hereinafter as the rotating disks 20. Each of these disks comprises a circular piece of metal, preferably steel, which has a square central aperture of a size that will permit it to pass easily over the square hub 12. For some distance in from its periphery, each of the disks is reduced in thickness by having its opposite sides cut away, and each of the cut away portions has attached to it an annular member 21, of such friction material as is employed for brake linings. For convenience, the members 21 will be referred to hereinafter as friction rings. From the foregoing it will be seen that the disks 20, with their respective friction rings, will rotate with the motor shaft and hub.

At each end of the series of rotating disks, and intermediate the adjacent ones of the series, is located a substantially square plate 25. These plates are movable longitudinally of the shaft and hub, but are prevented from rotating in a manner which will be presently explained. Each of the plates 25 has a central, circular aperture 26, within which the hub 12 may freely rotate, and each of the corners of the plate is notched at 27 for the reception of a block 28 which extends from the front to the rear walls of the casing and is supported upon a bolt 29 which passes entirely through the casing. The blocks 28 thus constitute guides for the plates 25, and prevent the plates from turning.

Clamped to the rear wall of the casing is a magnet-supporting plate 30, the bolts 29 serving to attach the plate to the casing by passing through the corners of the plate and having applied to them, the nuts 31. A circular threaded opening 32 occupies the central portion of the armature supporting plate, and this opening is substantially concentric with, and somewhat smaller than the aperture 9 that is formed in the rear wall of the casing.

The threaded portion 35 of a cylindrical wall 36 of a magnet casing 37 is adapted to be screwed through the threaded aperture 32 of the armature supporting plate. The magnet casing further comprises a heavy core 38 which is connected, at its rear end, to the rear edge of the cylindrical wall 36, by a circular wall 39. The magnet casing is preferably formed of a single casting, as illustrated in Fig. 1. A central bore 40 extends longitudinally through the core 38, and is occupied by a compression spring 41, the rear end of which bears against a follower 42 that may be adjusted longitudinally of the bore by means of a screw 43 that is threaded through a plate 44 secured by the cap screws 45, to the rear end of the magnet casing 37.

The coil of the magnet is shown at 46 and is wound with suitable tape 47 and occupies the space between the core 38 and the cylindrical wall 36 of the magnet casing. The coil is retained in place by an annular plate 48, preferably of brass, the inner and outer edges of which occupy shallow rabbeted portions 49 that are formed in the opposed edges of the core and wall 36, the plate 48 being held in place by screws 50. Attention is called to the fact that the thickness of the plate 48 is some greater than the depth of the rabbeted portions 49 of the magnet casing, for a purpose which will be presently explained. The ends of the magnet coil are shown at 51 and 52 as passing out through holes in the rear wall of the casing, suitable insulating bushings 53 and 54 being used to protect the wires where they pass through the aforesaid holes.

The armature plate 60 is located in the rear of the brake casing between the forward end of the magnet and the rear plate 25. The armature plate is of the same general shape as the plates 25, and has its corners notched at 61 for guidance upon the blocks 28. The rear face of the armature plate is recessed at 62 for the reception of the forward end of the spring 41; and riveted to the armature plate, and projecting forward therefrom, are posts 63, three of such posts being shown in the embodiment illustrated herein. These posts are arranged to bear against the rear plate 25.

When there is no current in the coil of the electromagnet, the spring 41 tends to move the armature plate forward and, through the posts 63 thereof, to force the plates 25 and disks 20 tightly together, the forward plate 25 bearing against the front wall 3 of the brake casing. The power of the brake is, therefore, dependent upon the tension of the spring 41 which may be adjusted by the screw 43, as previously described. Now, when the electromagnet is energized, the armature plate will be attracted by it and be drawn against the annular plate 48. This will remove the pressure of the posts 63 from the rear plate 25, and allow the plates 25 and the disks 20 to separate, and will permit a free rotation of the latter.

It was previously pointed out that the front surface of the annular plate 48 is spaced from the face of the magnet, by the excess thickness of said plate beyond the depth of the rabbeted portions 49 of the armature casing which are occupied by the edges of the plate. By this arrangement a slight "air gap" is formed between the magnet and its armature even while the latter is being acted upon by the former, which overcomes the inherent magnetism of the magnet casing, after the magnet has been deënergized. Following the customary installation of brakes of this character, the coil of the magnet may be in circuit with the motor so that when current is turned into the motor, the magnet will be energized and release the brake. When the current is turned off, therefore, the magnet will be de-energized, allowing the spring 41 to set the brake and stop the rotation of the motor shaft.

While I have described my improved brake specifically as associated with a motor, it will be understood, of course, that I do not limit it to such use, as the same may be employed in various other connections. And as regards the particular embodiment illustrated and described herein, I reserve the right to modify the same to any extent desired so long as the same falls within the scope of the annexed claims.

Having thus described my invention, what what I claim is:—

1. In a brake of the character described, the combination with a rotatable member, of a casing having opposed end walls, one of said end walls having an aperture through which the aforesaid member projects, a series of disks carried by said member, a series of plates alternating with the disks of the aforesaid series, said plates and disks being movable longitudinally of the rotating axis of said member, means for preventing the rotation of the plates, one of the end plates of the series being arranged to abut the aforesaid end wall of the casing, a member arranged to bear against the opposite end plate of the series, an armature plate located adjacent the end wall of the casing opposite the one through which the aforesaid rotatable member extends and having connection with the member which bears against the end plate of the series, the said adjacent end wall having an aperture, a magnet supporting plate connected to said end wall and having a threaded opening, and an electromagnet casing having a threaded portion for coöperation with the threaded opening of the magnet supporting plate.

2. A device of the character described comprising, in combination, a casing, brake mechanism inclosed therein, an armature operatively connected therewith, one of the casing walls having an aperture, an electromagnet one end of which projects through said aperture for coöperation with the armature. and connections between the magnet and the casing whereby the face of the magnet may be adjusted with respect to the armature.

3. A device of the character described comprising, in combination, a casing, brake mechanism inclosed therein, an armature operatively connected with said mechanism, one wall of the casing having a threaded aperture, and a magnet casing having a threaded portion for coöperation with the aforesaid aperture whereby the face of the magnet may be adjusted toward and from the armature.

4. In a brake of the character described, the combination with a rotatable member, of a brake element carried thereby, an abutment wherewith one side of said element is arranged to engage, an engaging member for coöperation with the opposite side of the element, the element and engaging member being movable longitudinally of the rotating axis of the aforesaid rotatable member, a device arranged to bear against the engaging member, means tending to move the device toward the same, an armature connected to said device, a magnet supporting member, and an electromagnet, said magnet having a screw connection with the magnet supporting member whereby the former may be adjusted with respect to the latter.

5. In a brake of the character described, the combination with a rotatable member, of a brake element carried thereby, an abutment wherewith one side of said element is arranged to engage, an engaging member for coöperation with the opposite side of the element, the element and engaging member being movable longitudinally of the rotating axis of the aforesaid rotatable member, a device arranged to bear against the engaging member, means tending to move the device toward the same, an armature connected to said device, a magnet supporting plate having a threaded aperture, and an electromagnet, having a threaded portion for coöperation with the threaded aperture of the supporting plate.

6. In a brake of the character described, the combination with a rotatable member, of a brake element carried thereby, an abutment wherewith one side of said element is arranged to engage, an engaging member for coöperation with the opposite side of the element, the element and engaging member being movable longitudinally of the rotating axis of the aforesaid rotatable member, a device arranged to bear against the engaging member, means tending to move the device toward the same, an armature connected to said device, a magnet supporting member adjacent said armature and rigidly connected to and spaced from the aforesaid abutment, said member having a threaded aperture, and an electromagnet having a threaded portion for coöperation with the threaded aperture of the aforesaid magnet supporting member.

In testimony whereof, I hereunto affix my signature in the presence of a witness.

THOMAS W. THOMAS.

Witness:
  BRENNAN B. WEST.